Patented Dec. 2, 1941

2,264,429

UNITED STATES PATENT OFFICE 2,264,429

PROCESS FOR PREPARING SUBSTITUTED PHTHALIC ANHYDRIDES

Ernst Bergmann, Rehovoth, Palestine, assignor to Compagnie de Produits Chimiques et Electrometallurgiques Alais Froges et Camargue, Paris, France, a corporation of France No Drawing. Application January 17, 1940, Serial No. 314,355. In France January 26, 1939

4 Claims. (Cl. 260—341)

Phthalic anhydrides which are very valuable raw materials for obtaining polycyclic dyes, may be prepared advantageously by using dienic synthesis in two stages. The first stage comprises a combination between a diene and maleic anhydride, the second stage a dehydrogenation of the primary product of hydro-aromatic character.

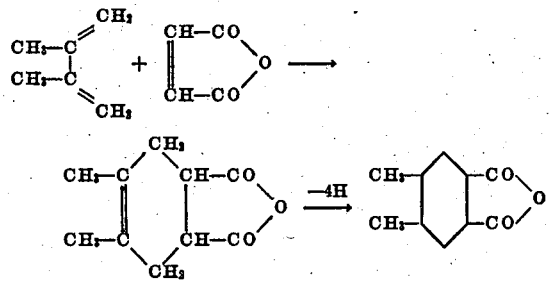

The dehydrogenation is not always easy to effect; in the case of the product formed from 1,4-diphenylbutadiene and maleic anhydride for example, prior investigators were quite unable to succeed in preparing the corresponding phthalic anhydride.

According to the present invention, phthalic anhydrides can be particularly easily produced in a single reaction, by carrying out the condensation in nitrobenzene or another nitrated aromatic substance which not only acts as a diluent, but also as a dehydrogenating agent by reducing itself and giving the corresponding amine.

The reaction may be effected with a diene or other appropriate unsaturated hydrocarbon such as α-vinyl-naphthalene, i. e., an hydrocarbon containing at least two conjugated double bonds.

Example 1

20 parts of 1,4-diphenylbutadiene, 10 parts of maleic anhydride and 15 parts of nitrobenzene are raised to a temperature of 200° C. for 3 hours. When the mixture is cooled, the liquid sets throughout and the 3,6-diphenylphthalic anhydride formed is filtered and, if necessary, recrystallized in methyl-ethyl-ketone or in xylene. It forms colourless needles, with a melting point of 224° C.

By treating with phenyl-magnesium bromide, it is converted into 2-benzoyl-3,6-diphenyl-benzoic acid, melting point 167° C. which is cyclized, by the known methods, into 1,4-diphenyl-anthraquinone. Similarly, the anhydride can be converted with the α-naphthols in the presence of boron oxide, into ketonic acids and then into oxynaphthacene-quinones, and it may be subjected to other characteristic reactions of unsubstituted phthalic anhydride.

Example 2

By heating in the same manner, in nitrobenzene (5 parts) 1-phenylbutadiene (13 parts) and maleic anhydride (10 parts), the anhydride of 3-phenylphthalic acid was obtained with an efficiency of 80%. It boils under a pressure of 2 millimetres at 190° C. and it can be advantageously recrystallized in benzene. Melting point 143° C.

Example 3

α-vinyl-naphthalene (15 parts) and maleic anhydride (20 parts) were heated in o-nitrotoluene (15 parts) for 2 hours at a temperature of 200° C. On cooling, the anhydride of phenanthrene-1,2-dicarbonic acid crystallized. After recrystallization in acetic anhydride, it has a melting point of 311 to 312° C.

I claim:

1. A process for preparing substituted phthalic anhydrides, which comprises the step of reacting an hydrocarbon, containing at least two conjugated double bonds, with maleic anhydride, in a nitrated compound which functions as hydrogen acceptor under the reaction conditions.

2. A process for preparing substituted phthalic anhydrides, which comprises the step of reacting a diene hydrocarbon with maleic anhydride, in a nitrated compound which functions as hydrogen acceptor under the reaction conditions.

3. A process for preparing substituted phthalic anhydrides, which comprises reacting an hydrocarbon, containing at least two conjugated double bonds, with maleic anhydride, in nitro-benzene.

4. A process for preparing substituted phthalic anhydrides, which comprises the step of reacting a diene hydrocarbon with maleic anhydride, in nitro-benzene.

ERNST BERGMANN.